United States Patent [19]

Voss

[11] Patent Number: 4,970,040
[45] Date of Patent: Nov. 13, 1990

[54] PROCESS AND APPARATUS FOR PRODUCING PACKING MATERIAL PARTICLES

[75] Inventor: Gerd Voss, Metzingen, Fed. Rep. of Germany

[73] Assignee: Storopack, Hans Reichenecker GmbH & Co., Metzingen, Fed. Rep. of Germany

[21] Appl. No.: 677,054

[22] Filed: Nov. 30, 1984

[30] Foreign Application Priority Data

Jun. 9, 1984 [DE] Fed. Rep. of Germany ....... 3421634

[51] Int. Cl.⁵ .......................... B29B 9/06; B29C 47/66
[52] U.S. Cl. ................................ 264/142; 264/211.21; 264/211.23; 425/202; 425/311
[58] Field of Search ...................... 264/45.5, 51, 54, 55, 264/142, 211.21, 211.23; 425/587, 308, 311, 202

[56] References Cited

U.S. PATENT DOCUMENTS

| | | | |
|---|---|---|---|
| 2,915,957 | 12/1959 | Bowman | 425/587 |
| 3,259,944 | 7/1966 | McIlvin | 425/557 |
| 3,703,347 | 11/1972 | Hester et al. | 425/67 |
| 3,745,200 | 7/1973 | Geyer | 264/211.21 |
| 3,954,366 | 5/1976 | Fields | 425/208 |
| 3,961,000 | 6/1976 | Ropiequet | 264/45.5 |

Primary Examiner—Mary Lynn Fertig
Attorney, Agent, or Firm—John F. Witherspoon

[57] ABSTRACT

In a case of a process for producing pourable spherical-segment-shaped packing material particles made of a plastic material which have an external convex and an internal concave surface, the plastic material is fed in by means of a feeding funnel through an opening in a bush surrounding the extrusion screw. The plastic material is plasticized and, because of the difference in speed existing over the cross section of the mass, comes out of an opening in the die with a bent surface. The extruded plastic material is cut off directly at the opening of the die and before any considerable expansion has taken place. In this case, the plastic material is pulled into a space between the extrusion screw and a bush (28) provided with longitudinal grooves (35) in the material pull-in zone (13). The result is a possibility for some of the plastic granules to escape into the longitudinal grooves (35) and an increased and steadier transport of material through the extruder (FIG. 1).

6 Claims, 4 Drawing Sheets

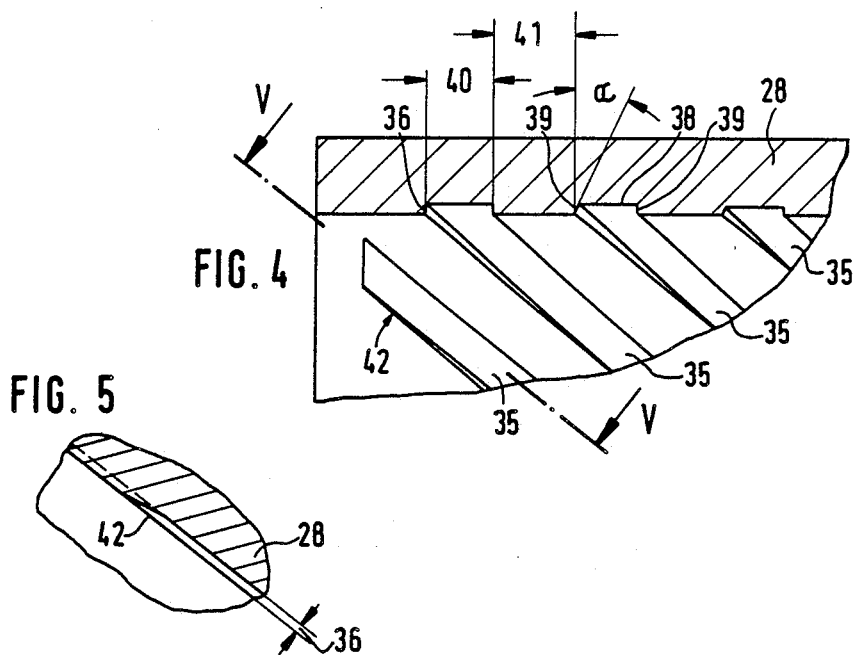
FIG. 4
FIG. 5
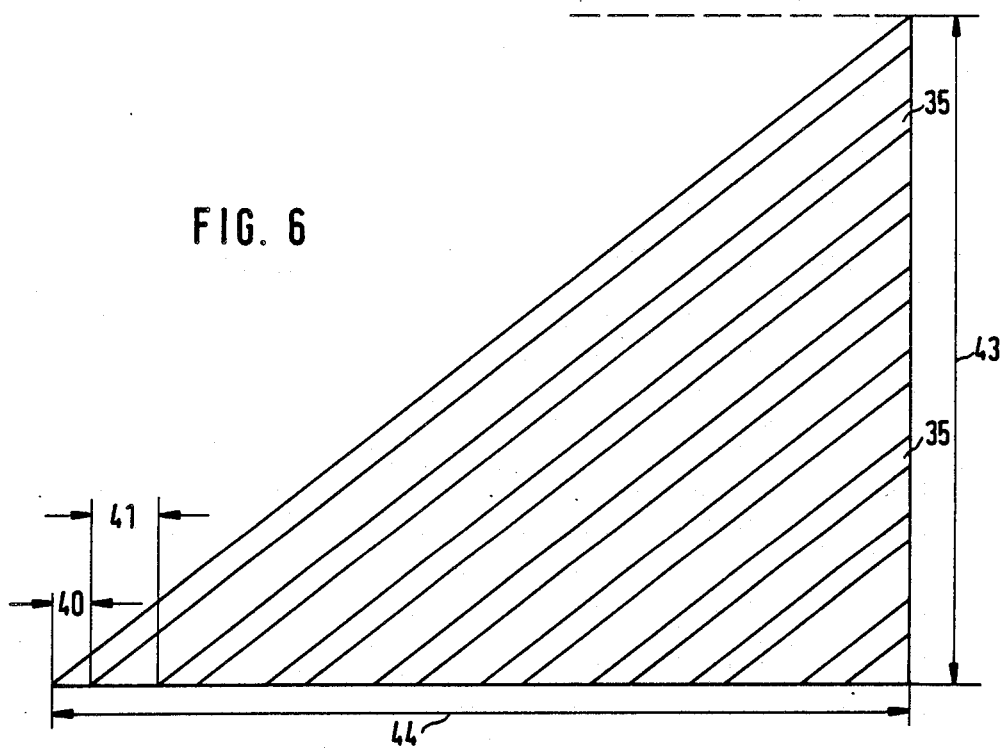
FIG. 6

PROCESS AND APPARATUS FOR PRODUCING PACKING MATERIAL PARTICLES

This invention relates to a process for producing pourable spherical-segment-shaped packing material particles made of a plastic material which have an external convex and an internal concave surface, where the plastic material, by means of a feeding funnel, is fed into an extruder through an opening in a bush surrounding the extrusion screw, where the plastic material is plasticized over the course of the extruder and, because of the difference in speed over the cross section of the mass, comes out of an opening in the die with a bent surface and the extruded plastic is cut off directly at the opening of the die and before any considerable expansion has taken place.

A process of this type is known from U.S. Pat. No. 3,961,000. In the case of this process, expandible polystyrene (EPS) and admixtures, via a delivery funnel, are fed into an extrusion device. An extrusion screw transports the plastic material (EPS) through the extruder, where the special design of the extrusion screw, i.e., an increasing core diameter, as well as a suitable temperature program result in a plasticizing of the plastic over the course of the extruder. Immediately after the plastic material comes out of an opening in the die, it is cut off by means of a cutting device, where it is made possible for the cut-off particles in a first expanding process to expand into the special shape, with a surface that is convex on the outside and concave on the inside. In several subsequent expanding processes, the packing material particles are processed to their final condition.

This continuous process depends on a large number of parameters. From an economic point of view, the throughput of plastic material through the extruder per time unit is of special interest. This throughput also is dependent on many parameters. This value is significantly influenced by the design of the extruder, i.e., the dimensions of the extrusion screw and of the bush surrounding it. In order to obtain a reproducible end product with low fluctuations of quality, it is absolutely necessary to be familiar with the chemical and physical processes occurring inside the extruder.

In order to obtain a uniformly structured extruder packing, the starting material (EPS) and the admixtures, such as the coloring pigments, the bubble-forming substances and similar materials, must be added steadily in this continuous process. The steady feeding in this starting phase of the process already influences the quality and naturally the quantity of the end product. A steady feeding is made possible by a so-called "stuffing" of the extruder. This means "hat the starting material is pressed into the extruder under pressure by means of a "stuffing device". This may, for example, take place by pressing the plastic material from a supply container by means of a "solid-matter screw" into the extruder. This introduction process requires a control and forms a component that is susceptible to trouble in a mechanism for carrying out the above-mentioned process. A stuffing screw that presses the material into the extruder under pressure must itself be supplied with material from a supply container so that the steady feeding of plastic material into the extruder requires considerable constructive and operational expenditures.

In the case of a feeding without an additional stuffing screw, the steadiness and the throughput are low, and the profitability of the above-mentioned process is therefore reduced.

It is the objective of the invention to improve a process of the initially mentioned type in such a way that without stuffing devices, a high throughput of material and a more steady transport of the material in the extruder is made possible.

This objective is achieved by the fact that the plastic material is pulled into the extruder in a space between the extrusion screw and the bush provided with longitudinal grooves in the zone where the material is pulled in, where by means of the possibility of escape of some of the plastic granules into the longitudinal grooves, an increased and more steady transport of material through the extruder is made possible.

In the case of this process, a feeding funnel, with its lower opening, rests on a corresponding opening on the bush in the pull-in zone of the extruder. The plastic granules are pressed into the so-called "groove entrance zone" only through the force of their weights.

The propelling sides of the spiral-shaped screw cause the advancing movement of the granules through the extruder which can be divided into an axial forward movement and a circular movement. The ratio of the speeds of the two movements determines the speed at which the granule advances through the extruder in transport direction. If the granule, for example, adheres at any point in the extruder, it will only carry out a circular movement and will no longer be advanced in axial direction. The larger this proportion, the less the transport of material in axial direction, in which case the space is also blocked for the material that follows. This means that the more granules rotate simultaneously with the screw in circular direction, the less the overall axial advancing quantity, i.e., the throughput quantity of the granules, where at the same time, the steadiness of the pulled-after material is not satisfactory. The grooves in the bush, for a certain number of granules over a certain cross-sectional area through an extruder in the entrance zone, offer an "escape corner". Thus less granules are slowed down directly at the screw, i.e., on the whole, less granules "adhere" at the screw, and thus less granules rotate along simultaneously in circular direction, which results in an increased material transport in transport direction. Thus, the granules located in the grooves are again pulled more in the direction of the screw core, or through the pressure are pressed out of the feeding funnel, where on the whole, an increased movement and a connected mixing of the granules is achieved. At the same time, because of the reduced "blocking", the volume required for the granules becomes smaller, and thus a more compact and more steady packing of granules per volume element is achieved.

In the groove entrance zone, the grooves have a constant depth of recess.

In comparison to a bush with a smooth interior surface, the material throughput at the same rotating speed of the screw can be approximately doubled.

It is of decisive significance that the granules do not become plasticized in this pull-in zone. If this were the case, the granules would squeeze themselves into the grooves, and the positive effect would be lost because of a quasi-smearing-over of the grooves. In the case of an indicated dimension figure of the cut-in grooves (depth of recess, width and number), the sizes of the granules can be varied over a relatively wide range without significantly limiting the advantageous effect.

The grooves very advantageously have a U-shaped cross sectional profile, where the two legs of the U are slightly inclined toward the outside.

The recess depth of the grooves, in a transition zone connecting to the groove entrance zone, decreases to zero. The plasticizing zone having a completely smooth inside surface of the bush then connects to said transition zone.

In the transition zone, because of the gradual decrease of space available to the material, a careful further densification of the plastic material takes place. The resulting frictional heat must not reach the quantum of heat that is sufficient to plasticize the material. An excess quantum of heat must be removed by cooling. The plasticizing of the plastic material will take place only in the plasticizing zone that follows this transition zone.

In an especially preferred embodiment, eight grooves are cut spirally into a bush with a diameter of about 50 mm. The throughput of EPS, in comparison to a smooth bush, could be increased from about 50 kg/h to 90 kg/h.

By means of the device according to the invention, the process can be carried out in an especially simple and cost-effective way without the use of stuffing screws or other stuffing devices.

In the following, the invention will be explained in detail by means of the embodiment shown in the drawing.

FIG. 4 is a partial enlarged section of an extruder bush having grooves;

FIG. 5 is a cut along V—V in FIG. 4; and

FIG. 6 is the design of the screw helix of the grooves.

Figure 1:
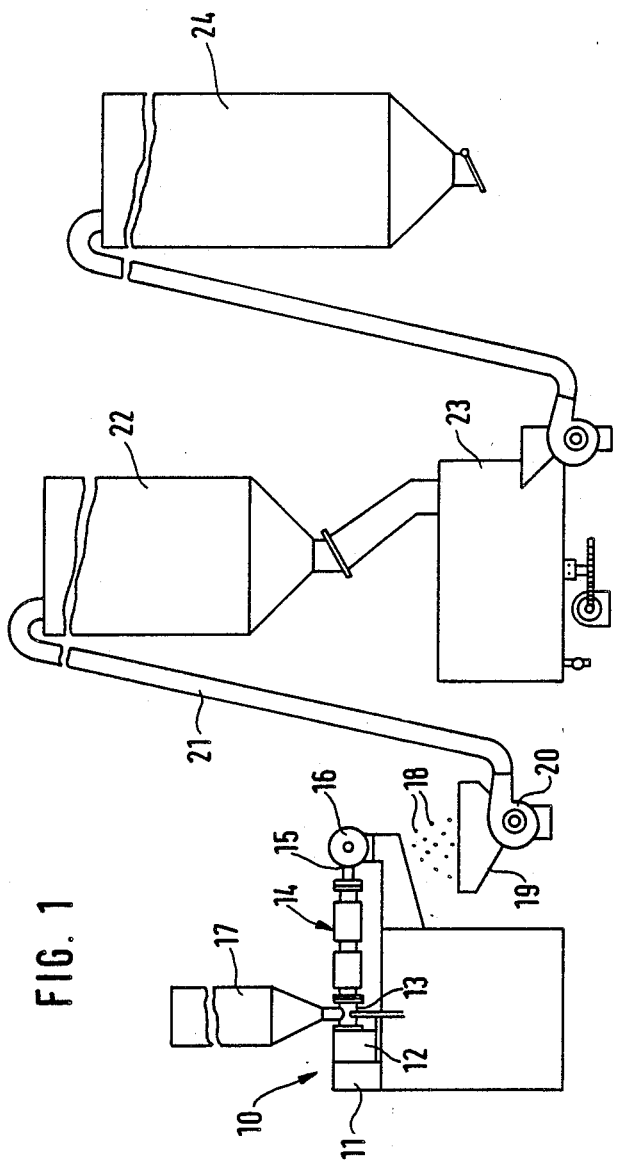
FIG. 1 is a diagrammatic side view of a device for producing packing material particles.

The device required for carrying out the process is shown in diagram form in FIG. 1 and has an extrusion device 10 consisting of a driving motor 11, a gear mechanism 12, a material pull-in zone 13 and an extruder 14. A cutting device 16 is arranged directly in front of a die opening 15 of the extruder 14. The extrudable expandable thermoplastic material that is added preferably in the form of granulated grains or tablets arrives in the extruder 14 through a feeding funnel 17 through the material pull-in zone 13. Such material may, for example, consist of polystyrene or other suitable polymers.

The material is plasticized over the longitudinal course of the extruder and comes out of the opening 15 in the form of a mass of melted plastic material. Because of the difference in speed occurring over the cross section of the mass, the plastic material squeezes out of the inside area of the die opening 15 having a bent surface.

The extruded material is cut off directly at the opening 15 by means of the cutting device 16.

The cut-off plastic particles expand in the free fall to a first expanded condition, in which case they already take their shape having a surface that is concave on the inside and convex on the outside. A collecting container 19 catches the solified and cooled plastic particles 18.

The intially expanded foam particles, by means of a blower 20, are transported through a pipe 21 into a storage container 22.

After a certain storage period, the initially expanded plastic particles 18 are transported from the storage container 22 into a re-expansion unit 23, where the plastic particles are re-expanded.

After leaving the re-expansion unit 23, the re-expanded plastic particles 18 are led to a storage container 24. This storage container 24 preferably consists of a sieve material or another open-mesh material so that a free circulation of air and thus an easier drying of the re-expanded plastic particles 18 is possible.

The particles that were expanded to their end condition, in order to carry out their function as packing material, must have a steady and uniform structure. In particular, the particles must have such stability that the pressure affecting the packing material through the stacking-together and during the transport does not result in a breaking of the packing material particles. In addition, the individual particle in itself must be closed off by a relatively smooth surface so that there will be no "crumbling" through the friction among the individual packing material particles. Another factor that is decisive with respect to the quality and the uniformity of the material is the steadiness with which the plastic material is fed into the extruder. The transport of material through the extruder per time unit determines the quantity of the plastic material coming out of the extruder and therefore determines, at a constant cutting performance of the cutting device 16, the size of the packing particles in the first expanded condition.

Figure 2:
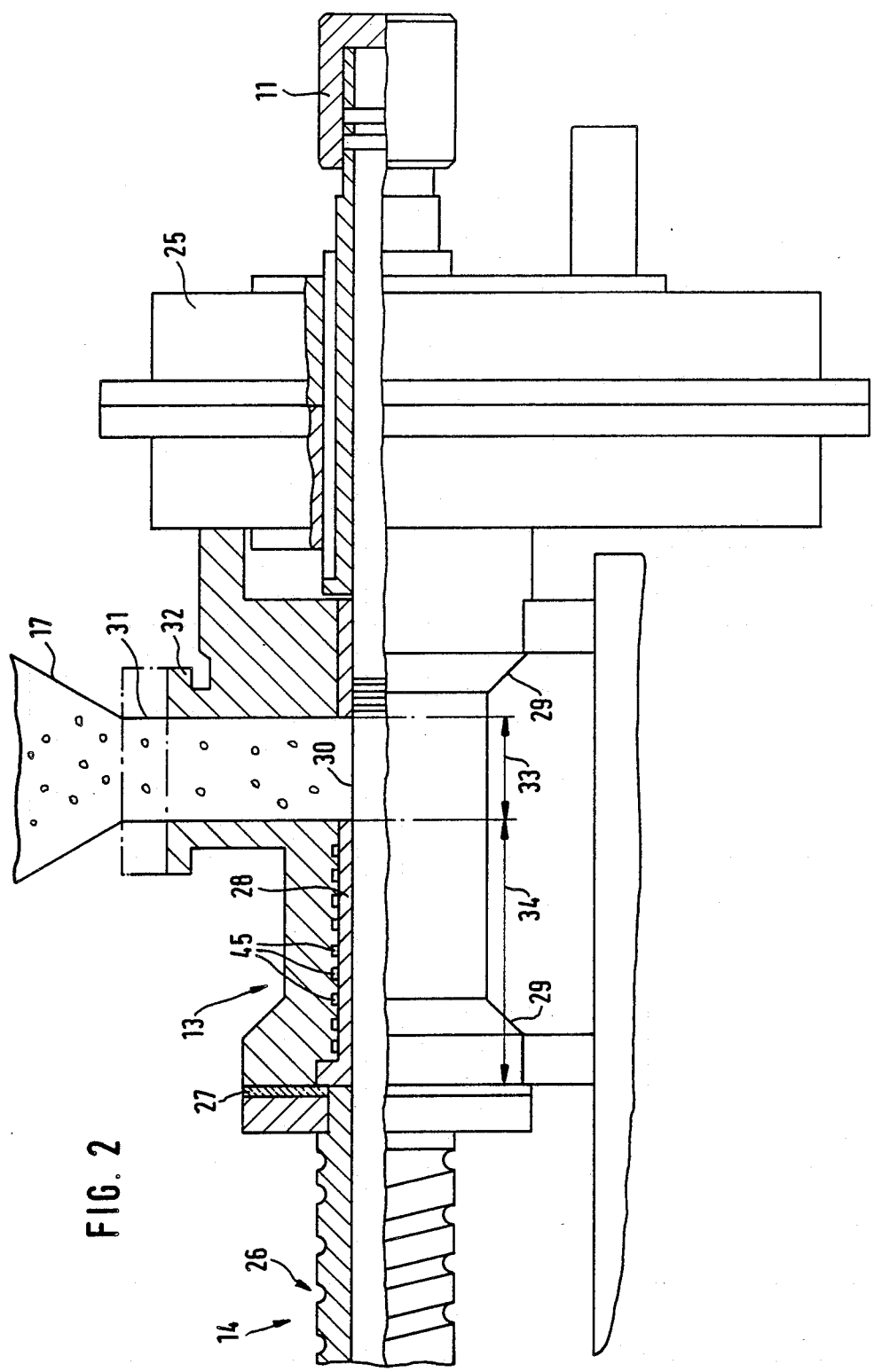
FIG. 2 is a partial side view of an extruding device with the material pull-in zone.

FIG. 2 is an enlarged view of the material pull-in zone 13 with the feeding funnel 17 placed on it. The material pull-in zone 13, on the right-hand side, is connected with a step-down gear 25 that is driven by a motor 11.

In transport direction, the material pull-in zone 13 is followed by a plasticizing zone 26. The plasticizing zone 26 and the material pull-in zone 13, along their connection 27, are thermically insulated.

The extrusion screw (not shown here) reaches through the material pull-in zone and the plasticizing zone and is driven by the motor 11 via the step-down gear 25. The extrusion screw, in the material pull-in zone, is guided by a bush 28 which is held by a support 29. The bush 28 is provided with an opening 30 through which the material is pulled from the feeding funnel 17 into the extruder 14. The feeding funnel 17, with its bottom side 31, is connected with a flange 32 of the support 29. The area of the bush 28 that is bordered by the opening 30 forms the groove entrance zone 33. The area of the bush connecting in transport direction to this groove entrance zone comprises a transition zone 34. As seen best in FIG. 3, several longitudinally extending grooves 35, are cut into the bush 28. In the area of the groove entrance zone 33, the grooves 35 have a constant depth 36 of recess. In the transition zone 34 connecting in transport direction to the groove entrance zone 33, the depth 36 of recess in transport direction decreases to zero.

The opening 30 in the bush 28 is about 80 mm long and about 50 mm wide. The transition zone 34 has a length of about 185 mm.

The bush 28 has a wall thickness 37 of about 13 mm.

FIG. 4 shows an enlarged cutout of a bush 28 in the area of the groove entrance zone 33 having grooves 35 with a constant depth 36 of recess.

The grooves 35 have a profile 38 that is U-shaped in its cross-section, with the two legs 39 of said U being inclined toward the outside by an angle $\alpha$. In the present embodiment, the angle of inclination. $\alpha$ is 15°. The depth 36 of recess of the grooves 35 is about 1.5 mm.

The width 40 of the grooves 35 is about 10 mm. The grooves in the embodiment shown here have a constant distance 41 from one another which amounts to about 15.5 mm.

The distance of the grooves is determined by the diameter of the bush 28 and the number of cut grooves as well as their width.

FIG. 5 shows a cut along the Line V-V in FIG. 4 which extends through a groove 35. The grooves 35, seen in transport direction, at the beginning of the bush 28, have a starting area 42 after which they reach their maximum depth 36 of recess which then in the groove entrance zone 33 is constant.

FIG. 6 shows the design of the groove helix in the material pull-in zone 13. The bush 28 is cut open in longitudinal direction and in the rolled-out condition has a "rectangular contour". Around the circumference 43 of the bush 28, eight grooves 35 are cut in at regular distances. After a distance 44 in transport direction, the helix will have made a complete 360° turn. The distance 44 in the present embodiment is about 203 mm.

Figure 3:
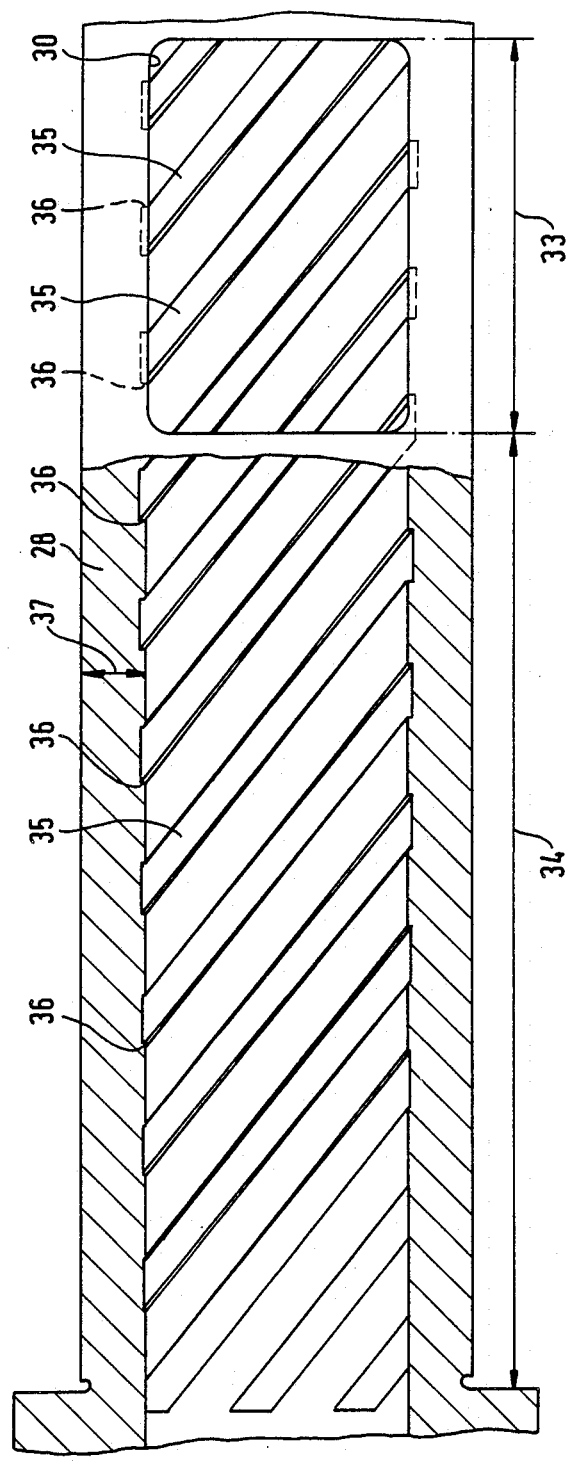
FIG. 3 is a broken partial top view of a material pull-in zone.

As best shown in FIG. 3, the material, during the operation, is pulled through the opening 30 into the bush 28. The extrusion screw (not shown here) pulls the plastic granules into the space between the screw and the groove entrance zone 33 provided with grooves 35 with a constant depth 36 of recess.

The plastic particles which have, for example, a mean core diameter of 0.5 mm, in the groove entrance zone 33, may escape into the grooves. Because of this mobility and the possibility to escape, less plastic particles rotate circularly simultaneously with the screw so that more material can be brought in transport direction by the screw into the transition zone 34.

Because of the inherent pressure of the plastic material and the mobility in the groove entrance zone, on the whole, more material can be transported in longitudinal direction by the extrusion screw. Because of the faster conveying and the larger mobility, less plastic particles "block" the space for the material in the groove entrance zone 33 that follows by being pushed out of the feeding funnel 17.

In the transition zone 34, the depth 36 of recess of the grooves in transport direction decreases to zero. The plastic material thus is packed more densely and more uniformly. The resulting frictional heat must not be sufficient to plasticize the material. Therefore, in this embodiment, cooling ribs 45 are arranged around the bush 28 in the transition zone 34 (see FIG. 2), in order to make it possible to decrease the heat.

The material will not be plasticized before it reaches the plasticizing zone 26. The transition zone 34 is therefore thermically insulated with respect to the plasticizing zone 26.

The core size of the material to be processed can be varied within a certain range without significantly limiting the advantageous effect.

According to the pull-in speed and the material, the bush 28 in the groove entrance zone 33, may also be provided with cooling ribs, so that it is always ensured that the material is not plasticized in the whole material pull-in zone 13. A plasticizing of the material would "smear over" the grooves and the advantageous effect of the grooves could not occur.

By means of the material pull-in zone with the grooves according to the invention, an increased pulling-in of material and a steadier flow of material can be achieved without stuffing devices, having a positive effect on the quality and the quantity of the end product.

I claim:

1. In a process for making pourable spherical-segment-shaped packing material particles of plastic material having an external convex and an internal concave surface, wherein said plastic material is fed into an extruder wherein said plastic material is plasticized and wherein a difference in speed over the cross section of mass of material causes said material to exit an opening in the die with a bent surface and wherein the extruded plastic is then cut off near the exit opening of the die before any substantial expansion has occurred, the improvement comprising (a) pulling said plastic material into a plasticizing zone of the extruder by preliminarily passing said material through an opening in a bush having first an entrance zone wherein the bush contains spiral grooves the depths of which are substantially constant throughout and secondly a transition zone wherein the bush contains spiral grooves the depth of which steadily decrease in the transport direction to zero, (b) providing thermal insulation between said plasticizing zone and said transition zone, and (c) maintaining the temperature of said plastic material in said entrance zone and said transition zone sufficiently low to prevent plasticizing said material therein.

2. In an apparatus for producing pourable spherical-segment-shaped packing material particles of plastic material which comprises a feeding funnel, an extruder having an extrusion screw therein to form a plasticizing zone, and a cutting means attached to the exit opening of the die of said extruder, the improvement wherein said apparatus further comprises a material pull-in zone located between said feeding funnel and said plasticizing zone, said pull-in zone including a bush having spiral grooves therein and comprising an entrance zone located near said funnel and a transition zone located near said plasticizing zone, the grooves in said bush in said entrance zone having depths which are substantially constant throughout and the grooves in said bush in said transition zone having depths which steadily decrease in the transport direction to zero, said plasticizing zone and said transition zone having a thermal insulation therebetween, and cooling means for maintaining said entrance zone and said transition zone at a temperature sufficiently low to prevent plasticizing said material therein.

3. An apparatus according to claim 1, characterized in that the bush has a diameter of about 5 cm, and the grooves in the entrance zone, have a depth of recess of about 1.5 mm and a width of about 10 mm.

4. An apparatus according to claim 1, characterized in that the grooves have a profile that is U-shaped in its cross section and has legs that are inclined toward the outside.

5. An apparatus according to claim 1, characterized in that the legs of the U-shaped profile are inclined toward the outside by about 15°.

6. An apparatus according to claim 1, characterized in that the entrance zone has a length of about 80 mm, and the transition zone has a length of about 180 mm.

* * * * *

UNITED STATES PATENT AND TRADEMARK OFFICE
CERTIFICATE OF CORRECTION

PATENT NO. : 4,970,040

DATED : November 13, 1990

INVENTOR(S) : Gerd Voss

It is certified that error appears in the above-identified patent and that said Letters Patent is hereby corrected as shown below:

```
Column 6, line 52, change "1" to --2--
Column 6, line 56, change "1" to --2--
Column 6, line 60, change "1" to --4--
Column 6, line 63, change "1" to --2--
```

Signed and Sealed this

Sixteenth Day of July, 1991

Attest:

HARRY F. MANBECK, JR.

Attesting Officer     Commissioner of Patents and Trademarks